(12) United States Patent
Dalley et al.

(10) Patent No.: US 11,130,021 B2
(45) Date of Patent: Sep. 28, 2021

(54) TRAMPOLINE FOR USE AS AN INPUT DEVICE FOR AN ELECTRONIC GAME

(71) Applicant: TGOMA NZ LIMITED, Christchurch (NZ)

(72) Inventors: Edward Noel Dalley, Christchurch (NZ); John Robert Howe, Christchurch (NZ)

(73) Assignee: TGOMA NZ LIMITED, Christchurch (NZ)

( * ) Notice: Subject to any disclaimer, the term of this patent is extended or adjusted under 35 U.S.C. 154(b) by 126 days.

(21) Appl. No.: 16/704,162

(22) Filed: Dec. 5, 2019

(65) Prior Publication Data

US 2020/0108293 A1    Apr. 9, 2020

Related U.S. Application Data

(63) Continuation of application No. 15/773,045, filed as application No. PCT/IB2016/056730 on Nov. 9, 2016, now Pat. No. 10,518,132.

(Continued)

(51) Int. Cl.
*A63B 5/11* (2006.01)
*A63B 24/00* (2006.01)
(Continued)

(52) U.S. Cl.
CPC ............ *A63B 24/0087* (2013.01); *A63B 5/11* (2013.01); *A63F 13/214* (2014.09); *A63F 13/245* (2014.09); *A63F 13/42* (2014.09); *A63F 13/428* (2014.09); *A63F 13/54* (2014.09); *A63B 71/023* (2013.01); *A63B 71/0622* (2013.01);
(Continued)

(58) Field of Classification Search
CPC ............ A63B 2225/52; A63B 2225/50; A63B 2220/833; A63B 2220/51; A63B 2220/30; A63B 2220/20; A63B 2220/10; A63B 2071/063; A63B 2071/0625; A63B 2024/0096; A63B 2024/0071; A63B 71/06322; A63B 13/34; A63B 13/428; A63B 13/42; A63B 13/425; A63B 13/214; A63B 24/0087
See application file for complete search history.

(56) References Cited

U.S. PATENT DOCUMENTS 6,758,753 B1   7/2004  Nagata
8,206,266 B2   6/2012  Hall
(Continued)

FOREIGN PATENT DOCUMENTS

CA    2772801 A1    9/2012
EP    0064359 A2    11/1982
(Continued)

*Primary Examiner* — Corbett B Coburn
(74) *Attorney, Agent, or Firm* — Dann, Dorfman, Herrell and Skillman, P.C.

(57) ABSTRACT

A trampoline as a controller or an input device for playing games, including a frame having a flexible mat divided into input zones and one or more neutral zones, a sensor arrangement to detect activity on the flexible mat, a controller configured to determine the bounce location and bounce zone of the activity and provide this information to a feedback generator for playing games on the trampoline, such that a user uses the trampoline to play games by jumping on the input and neutral zones.

20 Claims, 5 Drawing Sheets

Related U.S. Application Data

(60) Provisional application No. 62/252,655, filed on Nov. 9, 2015.

(51) Int. Cl.
  *A63F 13/245* (2014.01)
  *A63F 13/42* (2014.01)
  *A63F 13/214* (2014.01)
  *A63F 13/428* (2014.01)
  *A63F 13/54* (2014.01)
  *A63B 71/02* (2006.01)
  *A63B 71/06* (2006.01)

(52) U.S. Cl.
  CPC ............ *A63B 2024/0025* (2013.01); *A63B 2024/0043* (2013.01); *A63B 2024/0071* (2013.01); *A63B 2024/0096* (2013.01); *A63B 2071/063* (2013.01); *A63B 2071/0625* (2013.01); *A63B 2220/10* (2013.01); *A63B 2220/20* (2013.01); *A63B 2220/30* (2013.01); *A63B 2220/51* (2013.01); *A63B 2220/833* (2013.01); *A63B 2225/50* (2013.01); *A63B 2225/52* (2013.01)

(56) References Cited

U.S. PATENT DOCUMENTS

| | | |
|---|---|---|
| 9,289,680 B2 | 3/2016 | Yamazaki |
| 9,339,676 B2 | 5/2016 | Publicover |
| 9,700,748 B2 | 7/2017 | Howe |
| 9,962,570 B2 | 5/2018 | Dallmann |
| 2005/0043122 A1 | 2/2005 | Publicover et al. |
| 2005/0209053 A1 | 9/2005 | Knox |
| 2007/0205983 A1 | 9/2007 | Naimo |
| 2009/0156308 A1 | 6/2009 | Hsu |
| 2010/0033425 A1 | 2/2010 | Shasek et al. |
| 2010/0285882 A1* | 11/2010 | Hsu .................. A63F 13/42 463/37 |
| 2011/0034300 A1 | 2/2011 | Hall |
| 2012/0295763 A1 | 11/2012 | Lin |
| 2013/0072269 A1 | 3/2013 | Chen |
| 2013/0181907 A1 | 7/2013 | Russell et al. |
| 2013/0260886 A1 | 10/2013 | Smith |
| 2015/0321039 A1 | 11/2015 | Howe |
| 2015/0335930 A1 | 11/2015 | Dallmann |
| 2017/0128779 A1 | 5/2017 | Howe et al. |

FOREIGN PATENT DOCUMENTS

| | | |
|---|---|---|
| GB | 2475696 A | 6/2011 |
| WO | 2014098628 A1 | 6/2013 |

* cited by examiner

TRAMPOLINE FOR USE AS AN INPUT DEVICE FOR AN ELECTRONIC GAME

CROSS REFERENCE TO RELATED APPLICATIONS

This application is a continuation of U.S. application Ser. No. 15/773,045, filed May 2, 2018 which is the National Stage of International Application PCT/IB2016/056730, filed Nov. 9, 2016, which claims the benefit of U.S. Provisional Application No. 62/252,655, filed Nov. 9, 2015, the entireties of which are incorporated herein by reference.

FIELD OF INVENTION

The invention relates to a trampoline apparatus. More specifically, it relates to a trampoline for use as an input device for an electronic game.

BACKGROUND

Canadian patent publication CA 2,772,801 to Yjip Inc describes a trampoline including a frame and a jumping mat assembly that is supported by the frame to allow at least one user to bounce on the jumping mat. The trampoline also includes a sensor system that includes a plurality of sensors supported by the frame and/or the jumping mat assembly. The sensors are used to determine the status of a user or users on the trampoline.

SUMMARY OF THE INVENTION

In broad terms in one aspect the invention comprises a trampoline for use as an input device for an electronic game, the trampoline comprising:
  a flexible bouncing mat having an input zone and a neutral zone,
  a sensor arrangement comprising at least one sensor configured to provide output indicating activity of a user on the mat, and
  a controller configured to determine a zone location of the user on the mat based on output from the sensor arrangement, and provide an input to the electronic game based on the determined zone location of the user, an actuating input when a user bounces in the input zone and a neutral input when a user is in the neutral zone.

In at least some embodiments the trampoline further comprises a feedback generator controllable by the controller or an electronic game system for providing visual or audio feedback to the user. In at least some embodiments the neutral input causes the controller or the game to provide no feedback to the user. Alternatively, the neutral input causes the controller or the game to provide feedback to the user indicating that the user is on the neutral zone. Alternatively, the neutral input causes the controller or the game to provide feedback to the user indicating the user's cadence level.

In at least some embodiments the actuating input comprises any one of:
  directional input,
  alpha-numerical input, or
  object selection input.

In at least some embodiments the neutral input is a non-actuating input.

Alternatively, the input provided by controller to the an electronic game system is the determined zone location.

In at least some embodiments the trampoline together with an electronic game system arranged to provide feedback to a user based on the determined zone location, bouncing in the neutral zone causes the game to provide no feedback to the user or feedback indicating the user is on the neutral zone.

Alternatively, the controller is instead configured to provide the location of the user on the mat as location coordinates input to the game.

In at least some embodiments the an electronic game system is arranged to determine a zone location of the user on the mat based on the location coordinates input from the controller and provides feedback to a user based on the determined zone location, wherein the neutral zone causes the game to provide no feedback to the user or feedback indicating the user is on the neutral zone.

In a further aspect the invention comprises a method of operating a trampoline controller, the method comprising determining activity of a user on a trampoline based on measurements from a sensor arrangement, the trampoline comprising a flexible mat having an input zone and a neutral zone, determining a zone location of the user based on output from the sensor arrangement, providing an input to an electronic game based on the determined zone location, an actuating input when a user bounces in the input zone and a neutral input when a user is in the neutral zone.

In at least some embodiments the method further comprises providing visual or audio feedback to the user based on the determined zone location.

In at least some embodiments the neutral input causes providing no feedback to the user.

In at least some embodiments the neutral input causes providing feedback to the user indicating that the user is on the neutral zone.

In at least some embodiments the neutral input causes providing feedback to the user indicating the user's cadence level.

In a further aspect the invention comprises a method of providing feedback to a user on a trampoline, the method comprising determining an activity location of the user on the trampoline based on measurements from a sensor arrangement, the trampoline comprising a flexible mat having an input zone and a neutral zone, determining a zone location of the user based on the activity location, providing feedback to the user based on the determined zone location, activity within the neutral zone causing no feedback or neutral feedback to be provided to the user.

The invention provides a trampoline as an input device to control an electronic game, and which allows a user to provide continuous inputs to a game without losing bouncing momentum or cadence on the trampoline, which can reduce interaction performance and result in a poor user experience.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner.

The term 'connected to' includes all direct or indirect types of communication, including wired and wireless, via a cellular network, via a data bus, or any other computer structure. It is envisaged that they may be intervening elements between the connected integers. Variants such as "in communication with", "joined to", and "attached to" are to be interpreted in a similar manner.

The term 'computer-readable medium' should be taken to include a single medium or multiple media. Examples of multiple media include a centralised or distributed database and/or associated caches. These multiple media store the one or more sets of computer executable instructions. The term "computer readable medium" should also be taken to include any medium that is capable of storing, encoding or carrying a set of instructions for execution by a processor and that cause the processor to perform any one or more of the methods described above. The computer-readable medium is also capable of storing, encoding or carrying data structures used by or associated with these sets of instructions. The term "computer-readable medium" includes solid-state memories, optical media and magnetic media.

As used herein, '(s)' following a noun means the plural and/or singular forms of the noun.

As used herein, the term 'and/or' means 'and' or 'or' or both.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

BRIEF DESCRIPTION OF THE DRAWINGS

Embodiments of the invention are described with reference to the accompanying drawings by way of example and without intending to be limiting, wherein.

DETAILED DESCRIPTION OF PREFERRED FORMS

Figure 1:
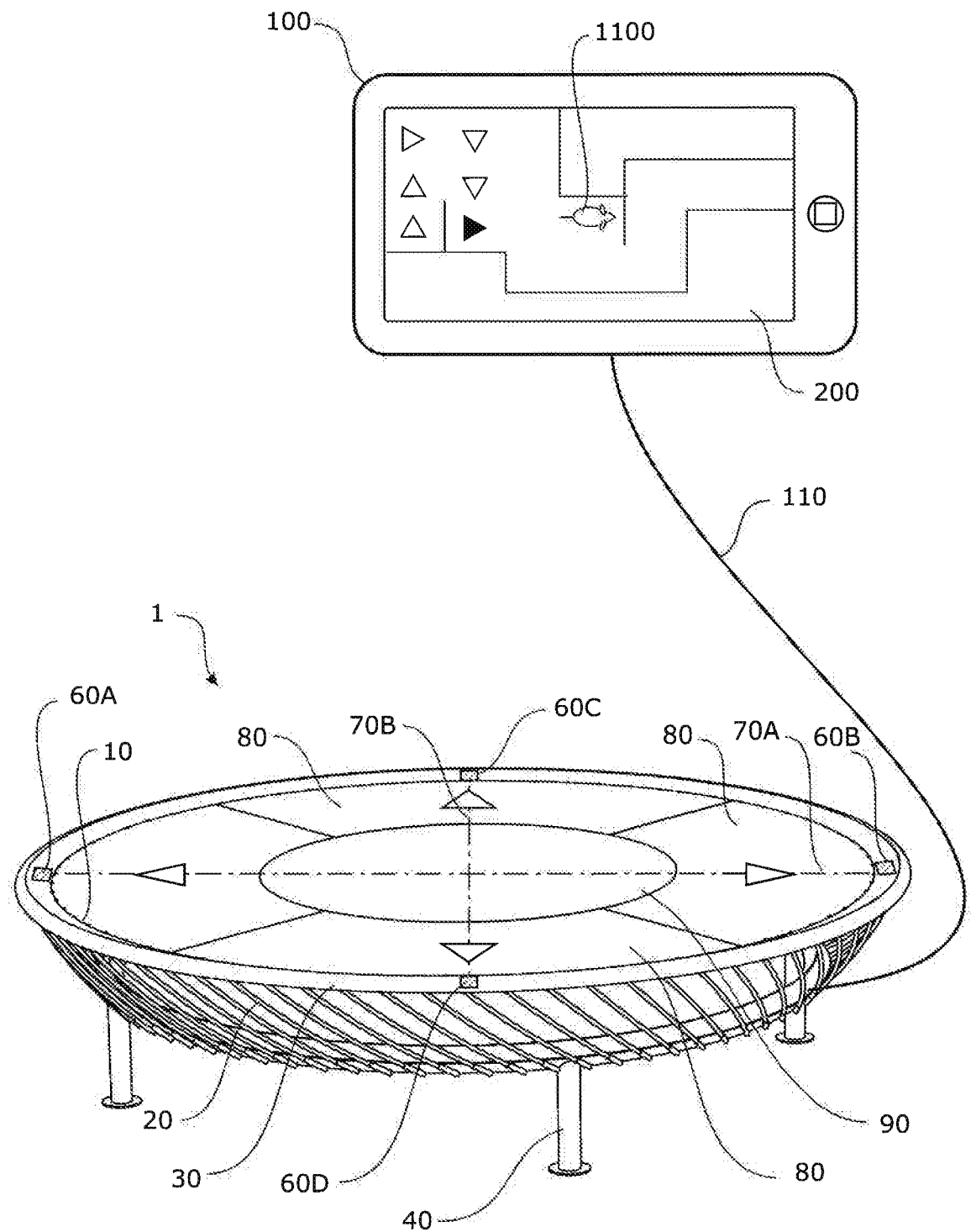
FIG. 1 is a perspective view of a preferred form trampoline as an input device to a gaming device for playing games.

FIG. 1 shows a preferred form of a trampoline 1 as a controller or an input device for playing games. The trampoline 1 comprises a flexible bouncing mat 10 divided into input zones 80 and one or more neutral zones 90, a sensor arrangement 60 to detect activity on the flexible mat 10, and a controller 100 configured to determine the bounce location and bounce zone of the activity and provide this information to a feedback generator 200 for providing feedback such as visual or audio feedback to a user on the trampoline. The feedback generator 200 may also be in the form of a gaming device with a visual display for playing games on the trampoline, such that the user uses the trampoline 1 to play games by jumping on the input 80 and neutral 90 zones. Each feature will now be described in detail.

In the preferred form the trampoline mat 10 on which a user may bounce, is supported by a plurality of resiliently flexible rods 20 and a base frame comprising a circular beam 30 typically formed of steel or aluminium and optionally supported from the ground by legs 40. The rods 20 are typically fibreglass rods but may alternatively be formed of spring steel for example. The lower ends of the rods are retained by the circular beam 30, for example the lower ends of the rods 20 enter into tubular holders 50 fixed to the circular beam 30 as shown. The upper ends of the rods connected to fittings as will be further described below, coupled to the mat 10 about the periphery of the mat.

The mat 10 is divided into one or more bounce zones 80 or areas configured to provide different inputs to a feedback generator or gaming device (as will be described in further detail below). As shown in FIG. 1, the mat is divided into left 80A, right 80B, up 80C or down 80D zones, as well as a neutral or safe zone 90. Details of zone configurations will be described further below.

The preferred form trampoline includes a sensor arrangement. The sensor arrangement comprises at least one sensor. As shown in FIG. 1, a preferred form sensor arrangement comprises two pairs of accelerometers. These accelerometers are shown at 60A, 60B, 60C and 60D. The four sensors 60 are shown as two pairs of sensors arranged around the mat. One pair of sensors 60A and 60B define an axis 70A across the mat. Sensors 60C and 60D define an axis 70B across the mat. As shown in FIG. 1, where there are two pairs of sensors, the pairs of sensors define orthogonal axes across the flexible mat 10.

In an embodiment the preferred form sensor arrangement comprises three or more sensors. In this embodiment the sensors are not necessarily provided as pairs of sensors arranged around the mat.

The sensor or sensors 60 are configured to indicate a value corresponding to a deformation of the mat 10 as the user (or object) bounces on the mat 10. The value indicated by the sensor(s) 60 corresponds to a proximity of the user or object to the sensor(s). The term 'deformation' as used in this specification and claims in relation to a mat deformation signal or value includes displacement, velocity and/or acceleration of the mat edge.

The sensors 60 are fixedly or removably mounted to the trampoline. Options, and techniques for determining a bounce location of a user on the mat based on the output of the sensor arrangement are described in PCT patent specification WO 2014/098628 for example, the entire contents of which are incorporated herein by reference.

Figure 2:
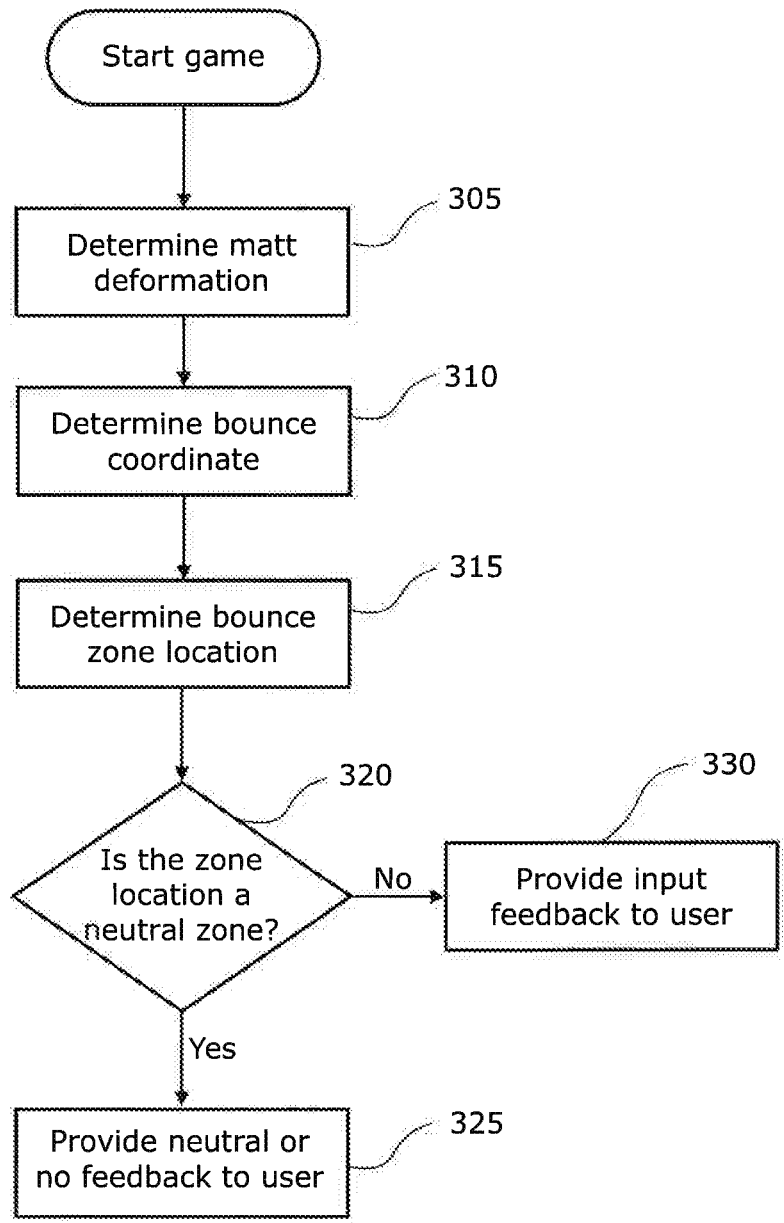
FIG. 2 shows a preferred form method for providing feedback to a user on the mat of a trampoline depending on the bounce zone location of the user.

FIG. 2 shows a preferred form technique for determining a bounce location of a user on the mat 10. As a user bounces on the flexible mat 10, the force exerted on the flexible mat is detected by the sensors 60. The method includes the step of determining 305 a mat deformation signal. In one preferred embodiment the signal includes data representing impact time and departure time that are then used for calculating the time of flight and for estimating bounce height. The impact time and the departure time define a bounce interval. Within the bounce interval is an interval of interest.

Once the mat deformation signal has been determined, the technique includes the step of determining 310 a bounce coordinate. The preferred form technique comprises calculating the sum of squared sample values for each of the sensors 60 during at least part of the interval of interest.

Once the bounce coordinate in a coordinate space has been determined, the technique includes the step of determining 315 a bounce zone 80. One or more bounce zones 80 can be associated with one or more regions on the flexible mat 10. There is stored a plurality of 'trained' zone positions. These trained positions represent average bounce coordinate readings recorded from a plurality of bounces on a single location on the flexible mat 10. The bounce zone of the user on the flexible mat is identified by finding the closest trained location of impact.

In some cases an actual bounce zone location could be close to more than one bounce coordinate. Disambiguation techniques are applied to such bounce locations. One preferred form technique involves storing a truth table of possible ambiguous results and a bounce zone location that should be used in each circumstance.

It is envisaged that there are several possible techniques, in addition to the techniques described above, for determining a bounce zone location of a user or object on the mat. In some examples, the flexible mat includes, or has placed upon it, sensors to assist in determining a bounce zone of the person. In these examples, the sensors are in physical connection with the flexible mat, the rods, or other components of the trampoline. Further techniques for determining bounce zone locations are described in PCT patent specification WO 2014/098628 for example.

The sensors 60 or sensor arrangement are connectable to a processor or controller 100 for receiving output from the sensors 60 or sensor arrangement and determining a bounce zone location of a user on the trampoline 1 using techniques described above. The sensors 60 are able to communicate either directly or indirectly with the controller 200 over a wireless connection, a wired connection, or a combination of wireless and wired connections.

The controller 100 is configured to control a feedback generator 200 to provide feedback to a user bouncing on or interacting with the trampoline. The feedback generator 100 can be in the form of a visual display or a light for providing visual feedback and/or a speaker for providing audio feedback. The feedback generator 200 could also be a gaming device in the form of a handheld tablet or computing device with a display screen and a user interface for interacting with and providing feedback to the user for playing games on the trampoline. The controller 100 can pass the determined zone location of the user on the trampoline to the feedback generator as input. In one embodiment, the controller 100 transfers information to the feedback generator 200 through an application programming interface (API). The information passed from the controller 100 to the computing device could include determined bounce coordinates of the user, determined bounce zone location of the user, notification that the user has departed the mat and time spent on the mat during use. Information related to determined bounce zone location of the user could include zones that provide actuating inputs such as directional inputs and zones that provide no input or neutral input such as the neutral or safe zones.

In one embodiment, the controller 100 is separate to the feedback generator 200, and configured to communicate with the feedback generator 200 over a wireless connection, a wired connection, or a combination of wireless and wired connections. In another embodiment, the controller 100 is located with the feedback generator 200. For example, it should be appreciated that the handheld tablet or computing device can provide both functions of the controller 100 and the feedback generator 200. In this embodiment, the controller 100 is the onboard processor of the handheld tablet or computing device and the feedback generator 200 can be the display screen for providing visual feedback and a speaker for providing audio feedback to the user.

Referring to 320 of FIG. 2, the controller 100 is configured to control the feedback generator 200 to provide feedback to the user depending on the determined bounce zone location of the user on the trampoline 1. Referring to 325 of FIG. 2, the controller 100 is configured to control the feedback generator 200 to provide feedback to the user on the trampoline when the determined bounce zone location of the user is an input zone that corresponds to providing actuating inputs to a game, such as, but not limited to; directional, alphanumerical or objection-selection inputs. Referring to 330 of FIG. 2, the controller 100 is also configured to control the feedback generator 200 to provide no feedback to the user on the trampoline when the determined bounce zone location of the user is a zone that corresponds to a neutral zone. Non-limiting examples of a neutral zone includes a no-input zone, safe zone or rest zone. This advantageously allows the user on the trampoline to continue bouncing activity on the trampoline and maintain a steady cadence (or tempo or rhythm or activity levels) while considering the next actuating zone input. In other words, bouncing on the neutral zone(s) give a user a chance to consider the user's next bounce zone location(s) without prematurely forcing the user to bounce on a zone location to continue playing the game without pause. Further, the neutral zone allows a user to maintain the user's activity level on the trampoline while considering their next bounce zone location or move.

In one embodiment, the controller is configured to control the feedback generator 200 to provide a neutral feedback rather than no feedback to the user on the trampoline when the determined bounce zone location of the user is a zone that corresponds to a neutral zone as described above. A non-limiting example of a neutral feedback is a sign shown on a feedback generator 200 visual display which indicates to the users that they are bouncing on a neutral, no-input, safe or rest zone. Similarly, a neutral feedback can also be an audio cue or voice-guided feedback to the users that they are bouncing on such a neutral zone. The neutral feedback provides similar advantages of allowing the users to consider their next bounce zone locations without forcing them to bounce on undesirable bounce zones or stopping/reducing their activity level.

Figure 3:
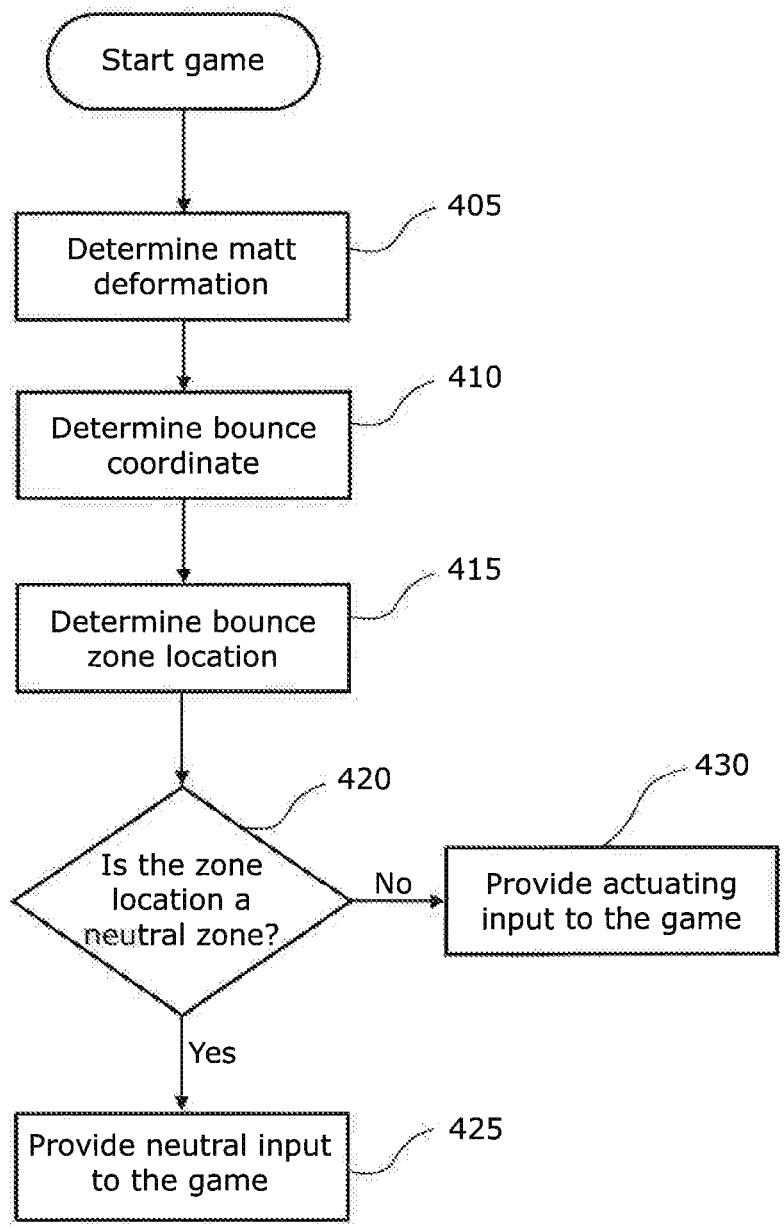
FIG. 3 shows a preferred form method for providing inputs to a game depending on the bounce zone location of a user on the trampoline.

Referring to FIG. 3, the controller provides different inputs to the feedback generator or game depending on whether the determined bounce zone location of the user is a neutral zone location. At step 425, if the bounce zone location of the user is determined to be a neutral zone, then the controller 100 will provide a neutral or null input to the feedback generator or game. This will result in the feedback generator 200 or game providing no feedback to the user on the trampoline, or trigger the feedback generator 200 or game to provide a neutral feedback as described above to the user. At step 430, if the bounce zone location of the user is determined to not be a neutral zone, then the controller 100 will provide a normal or actuating input to the feedback generator 200 or game corresponding to the indicated input zone on the trampoline.

Figure 4:
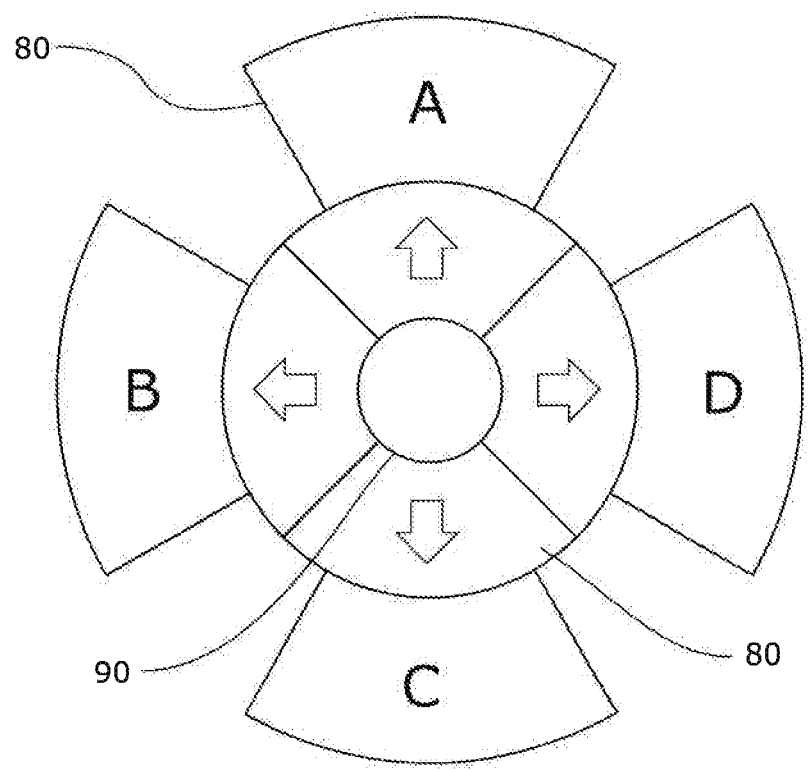
FIG. 4 shows a representation depicting a directional trampoline input zone configuration with a neutral zone positioned in the middle.
Figure 5:
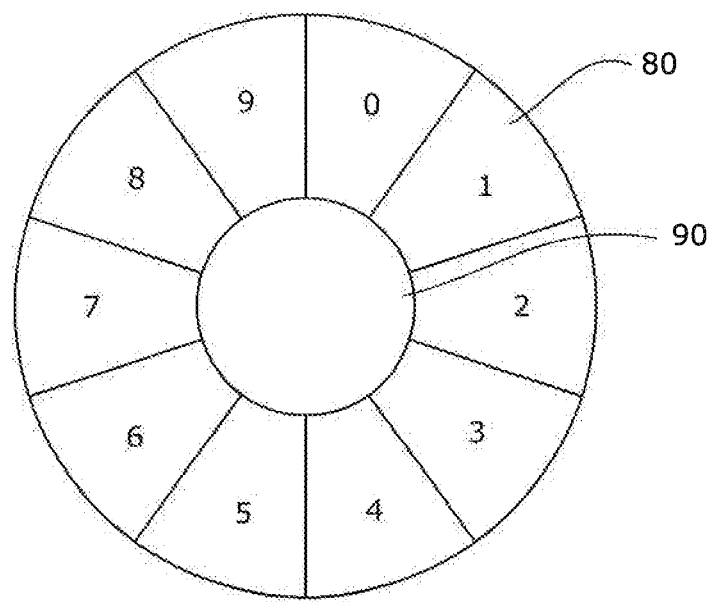
FIG. 5 shows a representation depicting a numerical trampoline input zone configuration with a neutral zone positioned in the middle.

It is envisaged that there will be many different configurations for bounce zones 80 which incorporates a neutral zone 90. FIGS. 4 and 5 show possible zone configurations incorporating a neutral zone 90 for providing directional or alpha-numeric inputs for playing games on the trampoline 1. FIG. 4 shows a zone configuration which resembles a game controller directional pad suitable for games that require up, down, left and right directional inputs with a neutral input zone 90 placed in the middle. FIG. 5 shows a zone configuration with numerical input zones in an outer perimeter and a neutral input zone placed in the middle.

FIG. 1 provides an example of how the trampoline can be used as an input device or controller for playing games. FIG. 1 shows a trampoline 1 connected to a gaming device which includes a processor 100 and a feedback generator 200, the feedback generator further comprises a display showing a graphical user interface. The display shows an avatar 1100 within a virtual environment. In this case the virtual environment comprises a maze. The user is presented with a goal, which in the illustrated example, includes navigating through an environment. The user is presented with at least one bounce location target within the virtual environment.

The bounce instructions presented to a user vary according to the position of the user's avatar within the environment. For example the avatar 1100 is constrained from movement in two directions by obstacles such as walls. The user is presented with two alternative bounce instructions. From the perspective of the user, the bounce instructions include leftward movement and downward movement. From the perspective of the user's avatar, the bounce instructions include backward movement or rightward movement. Each time a user's avatar moves to a new position in the environment, a new set of alternative bounce instructions is presented to the user.

The user could jump on the desire input zones 80 which provide a corresponding input to the gaming device and moves the avatar 1100 accordingly. When the user needs some time to consider the next directional movement of the avatar 1100, he/she could jump within the neutral input zone 90 which will not affect the movement of the avatar 1100. In other words, the user will not get any movement feedback from the gaming device or avatar when he/she bounces on the neutral input zone 90.

Figure 6:
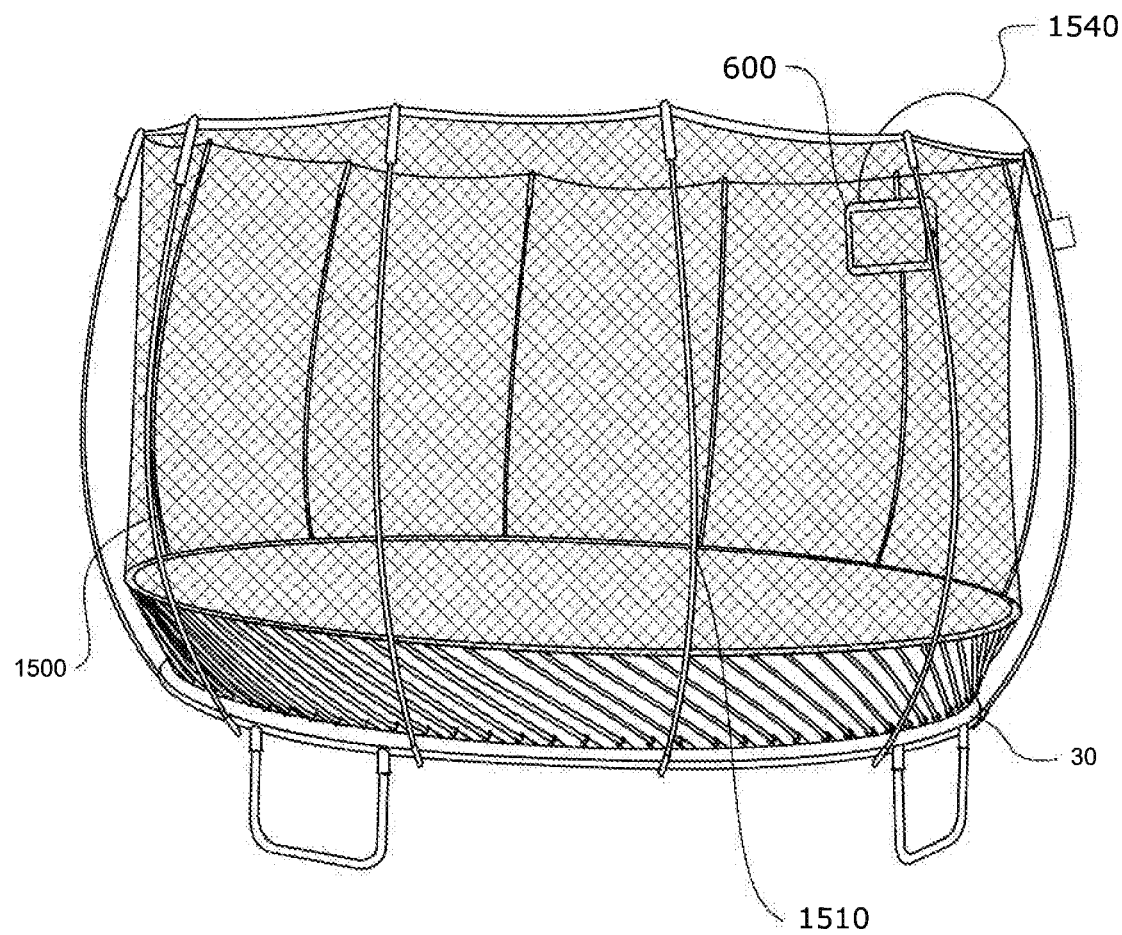
FIG. 6 shows a preferred form of trampoline arrangement for mounting a gaming device.

FIG. 6 shows a preferred form trampoline that includes an enclosure system. The enclosure system consists of a plurality of resiliently flexible generally upright enclosure support members 1500 which in the preferred form are flexible or deformable fibreglass rods. Enclosure support members 1500 are referred to below as enclosure rods for convenience but it is to be understood that this term is non-limiting in relation to the size and cross-sectional shape of the enclosure support elements and the material from which they are formed.

The preferred form enclosure system also comprises a barrier net 1510. The enclosure rods 1500 support the net 1510 above the flexible mat. The lower edge of the barrier net 1510 is coupled directly or indirectly to the peripheral edge of the mat. Barrier net 1510 is typically formed of a lightweight but strong net material. Alternatively this could be a flexible fabric material which is for example opaque or which is perforated so as to be semi-opaque. The enclosure rods 1500 are positioned on the outside of the net 1510 as shown. The enclosure rods are coupled to the circular beam 30 at the lower ends of the enclosure rods and to the upper peripheral part of the net 1510 at or towards the upper ends of the enclosure rods 1500. Preferred form enclosures are more particularly described in our U.S. Pat. No. 7,708,667.

Where there is an enclosure provided as shown in FIG. 6, there is preferably provided a mounting arrangement comprising a flexible rod 1510. The flexible rod 1540 is fixedly or removably mounted at point 1550 to one or more of the enclosure rods 1500. The flexible rod 1540 is shaped and formed to enable a user to position at least part of the flexible rod 1540 within the barrier net 1510. Preferably the flexible rod 1540 is constructed so that it can be manipulated and configured yet retain a shape desired by the user.

The flexible rod 1540 is preferably provided with a mounting point to enable a gaming device 600 to be removably attached and supported by the flexible rod 1540. The gaming device 600 preferably comprises a smart phone, tablet device or a computing device. The device is preferably provided with wireless connectivity. Alternatively the mounting point includes a dock adapted to establish a physical connection with the gaming device 600. The mounting point is preferably configured to pivot to enable a wide range of positions and angles for the gaming device 600. Alternatively the flexible rod 1540 is sufficiently flexible to permit a selection of various angles.

In an alternative embodiment the mounting arrangement is fixedly or removably mounted to the barrier net 1510. The mounting arrangement is constructed to enable handheld device 1560 to be removably attached to the mounting arrangement so that in use the handheld device is supported in a position inside or outside the barrier net 1510. Alternatively the mounting arrangement otherwise suspends the handheld device inside or outside the barrier net 1510.

In use the sensor arrangement 60 is able to communicate either directly or indirectly with the gaming device 600 over a wireless network, a wired network, or a combination of wireless and wired networks.

As the user jumps or bounces on the flexible mat 10 the bounce zones identified by the techniques described above are passed through an application programming interface (API) as input to the gaming device 600.

Preferably the gaming device 600 includes at least a processor, a display, and a user input facility. This user input facility includes for example a touch screen on the device 600 and the inputs specified as bounce zones from the user on the flexible mat 10.

The handheld device 600 operates under application specific software that takes as input data representing the bounce zones or locations from the user and uses these inputs to provide feedback to a user viewing the handheld device 600. The device 600 provides normal or actuating input feedback to the user when the user bounces on an input zone of the trampoline as described above. The device 600 provides neutral or no feedback to the user when the user bounces on a neutral zone of the trampoline as described above. The device 600 in combination with the trampoline embodiments described above provide apparatus relating to gaming, communication, rehabilitation and the like.

It will be appreciated that the mounting arrangement comprising the flexible rod 1540 could also include a shower proof hood or sunshade to protect the gaming device 600 and/or to make the display more visible to the user. It will be appreciated that the display could also include a projector able to take input from the gaming device 600 and to project an image or display on to a surface.

The foregoing describes the invention including preferred forms thereof. Modifications and improvements as would be obvious to those skilled in the art are intended to be incorporated in the scope hereof, as defined by the accompanying claims.

The invention claimed is:

1. A trampoline for use as an input device for an electronic game, the trampoline comprising:
    a flexible bouncing mat comprising a mat surface area comprising a neutral zone located in the middle of the mat and input zones closer to a periphery of the mat than the neutral zone,
    a sensor arrangement comprising at least one sensor configured to provide output indicating bouncing of a user on the mat,
    an electronic device configured to:
        determine a zone location of the user on the mat based on output from the sensor arrangement, and
        provide an input to an electronic game based on the determined zone location, an actuating input when a user bounces in the input zone and a non-actuating input when a user bounces in the neutral zone, and provide visual or audio feedback to the user including visual or audio feedback to the user indicating when the user bounces on the neutral zone.

2. A trampoline as claimed in claim 1 wherein the input zones are spaced around the neutral zone.

3. A trampoline as claimed in claim 2 comprising four input zones.

4. A trampoline as claimed in claim 3 wherein said four input zones are indicative of four different directional inputs to the electronic game.

5. A trampoline as claimed in claim 1 wherein the actuating input comprises directional input.

6. A trampoline as claimed in claim 1 wherein the actuating input comprises object selection input.

7. A trampoline as claimed in claim 1 wherein the input zones comprise all of the surface area of the mat other than the neutral zone.

8. A trampoline as claimed in claim 1 wherein the at least one sensor is an accelerometer.

9. A trampoline as claimed in claim 1 wherein the at least one sensor is mounted to the trampoline mat.

10. A trampoline as claimed in claim 1 wherein the sensor output indicating bouncing of a user on the mat is indicative of an extent of deformation of the mat on a bounce of a user on the mat.

11. A trampoline as claimed in claim 1 wherein the sensor output indicating bouncing of a user on the mat is indicative of a mat impact time and a mat departure time for a bounce of a user on the mat.

12. A trampoline as claimed in claim 1 wherein said input to the electronic game comprises a bounce coordinate.

13. A trampoline as claimed in claim 1 wherein the electronic game is arranged to display to the user a series of time sequential bounce targets each indicative of one of said input zones or neutral zone of the mat.

14. A trampoline as claimed in claim 1 wherein the sensor is wirelessly connected to the controller.

15. A trampoline as claimed in claim 1 comprising a mount for a gaming device, the mount comprising a flexible rod mounted to the trampoline which enables pivoting of a gaming device to a range of viewing angles.

16. A method of operating a trampoline controller, the method comprising:

determining activity of a user on a trampoline based on measurements from a sensor arrangement, the trampoline comprising a flexible mat having an input zone and a neutral zone, the neutral zone located in the middle of the mat and the input zone closer to a periphery of the mat than the neutral zone, determining a zone location of the user based on output from the sensor arrangement, providing an input to an electronic game based on the determined zone location, an actuating input when a user bounces in the input zone and a non-actuating input when a user is in the neutral zone, providing visual or audio feedback to a user including feedback indicating when a user is bouncing on the neutral zone.

17. A trampoline system comprising:

a trampoline comprising a flexible bouncing mat comprising a mat surface area comprising a neutral zone located in the middle of the mat and four input zones spaced around the neutral zone, sensors attached to the mat and configured to provide output indicating bouncing of a user on the mat and wirelessly connected to the controller, an electronic device running an electronic game and configured to:
  determine a zone location of the user on the mat based on output from the sensors,
  provide an input to the electronic game based on the determined zone location, an actuating input when a user bounces in the input zone and a non-actuating input when a user bounces in the neutral zone, and
  provide visual or audio feedback to the user including visual or audio feedback to the user indicating when the user bounces on said zones.

18. A trampoline as claimed in claim 17 wherein said four input zones are indicative of four different directional inputs to the electronic game.

19. A trampoline as claimed in claim 18 wherein said zones comprise all of the surface area of the mat.

20. A trampoline as claimed in claim 17 wherein the electronic game is arranged to display to the user a series of time sequential bounce targets each indicative of one of said input zones or neutral zone of the mat.

* * * * *